(12) United States Patent
Tseng et al.

(10) Patent No.: US 9,632,529 B2
(45) Date of Patent: *Apr. 25, 2017

(54) PORTABLE COMPUTER

(71) Applicant: Wistron Corporation, Hsinchu (TW)

(72) Inventors: Tien-Chung Tseng, Hsinchu (TW); Ming-Ju Hsieh, Hsinchu (TW); Chien-Yuan Lai, Hsinchu (TW)

(73) Assignee: Wistron Corporation, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/812,429

(22) Filed: Jul. 29, 2015

(65) Prior Publication Data

US 2015/0331457 A1 Nov. 19, 2015

Related U.S. Application Data

(62) Division of application No. 13/616,778, filed on Sep. 14, 2012, now Pat. No. 9,218,022.

(Continued)

(30) Foreign Application Priority Data

Apr. 3, 2012 (TW) .............................. 101111901 A

(51) Int. Cl.
*G06F 1/16* (2006.01)
*H04M 1/00* (2006.01)

(52) U.S. Cl.
CPC .......... *G06F 1/1615* (2013.01); *G06F 1/1616* (2013.01); *G06F 1/1624* (2013.01); *G06F 1/1637* (2013.01); *G06F 1/1681* (2013.01)

(58) Field of Classification Search
CPC ..... G06F 1/1615; G06F 1/1624; G06F 1/1616

(Continued)

(56) References Cited

U.S. PATENT DOCUMENTS 5,008,976 A 4/1991 Busch
5,168,426 A * 12/1992 Hoving ................. G06F 1/1681
16/361

(Continued)

FOREIGN PATENT DOCUMENTS

CN 2174715 Y 8/1994
TW 426174 U 3/2001

(Continued)

OTHER PUBLICATIONS

Taiwan Patent Office, Office Action of corresponding Taiwan Application No. 101106214 (including 6 pages English translation of marked portion of pp. 1-8 of Office Action), issued Jun. 17, 2014, 16 pages.

(Continued)

*Primary Examiner* — Nidhi Thaker
(74) *Attorney, Agent, or Firm* — Alan D. Kamrath; Kamrath IP Lawfirm, P.A.

(57) ABSTRACT

A portable computer includes a base, a display module, at least one supporting element and at least one sliding assembly. The base includes a first area and a second area. The display module includes a connect end and a display face. Each supporting element includes a first end pivoted on a portion of the display module other than the display face and a second end pivoted on the rear end of the base. Each sliding assembly includes a slide rail disposed at least in the second area and a sliding block connected with the connect end and moved along the slide rail. Each sliding block includes at least one auxiliary sliding structure for decreasing sliding friction.

13 Claims, 16 Drawing Sheets

Related U.S. Application Data

(60) Provisional application No. 61/561,312, filed on Nov. 18, 2011.

(58) Field of Classification Search
USPC ............. 361/679.01–679.39, 679.55–679.59; 455/575.1, 575.3, 575.4
See application file for complete search history.

(56) References Cited

U.S. PATENT DOCUMENTS

| | | | |
|---|---|---|---|
| 5,251,096 A | 10/1993 | Hosoi et al. | |
| 5,255,154 A | 10/1993 | Hosoi et al. | |
| 5,345,362 A * | 9/1994 | Winkler | A61N 1/37235 248/456 |
| 5,355,278 A | 10/1994 | Hosoi et al. | |
| 5,982,617 A | 11/1999 | Haley et al. | |
| 6,212,069 B1 | 4/2001 | Janik et al. | |
| 6,353,536 B1 | 3/2002 | Nakamura et al. | |
| 6,480,373 B1 | 11/2002 | Landry et al. | |
| 6,980,423 B2 | 12/2005 | Tanaka et al. | |
| 7,107,084 B2 * | 9/2006 | Duarte | G06F 1/1616 379/433.12 |
| 7,126,816 B2 | 10/2006 | Krah | |
| 7,158,634 B2 * | 1/2007 | Eromaki | G06F 1/1615 345/168 |
| 7,184,263 B1 * | 2/2007 | Maskatia | G06F 1/1616 248/917 |
| 7,280,348 B2 * | 10/2007 | Ghosh | G06F 1/1616 248/225.11 |
| 7,611,113 B2 * | 11/2009 | Lai | G06F 1/1616 248/286.1 |
| 7,639,494 B2 | 12/2009 | Lin | |
| 7,652,873 B2 | 1/2010 | Lee | |
| 7,876,554 B2 | 1/2011 | Chou et al. | |
| 7,907,393 B2 | 3/2011 | Sellers | |
| 7,916,462 B2 | 3/2011 | Hung | |
| 8,081,437 B2 | 12/2011 | Leng | |
| 8,199,475 B2 * | 6/2012 | Yeh | G06F 1/1616 361/679.27 |
| 8,248,789 B2 * | 8/2012 | Wu | H04M 1/0216 345/168 |
| 8,537,542 B2 * | 9/2013 | Chen | G06F 1/1616 345/168 |
| 8,605,417 B2 | 12/2013 | Lin et al. | |
| 8,644,012 B2 | 2/2014 | Lee | |
| 8,770,538 B2 * | 7/2014 | Hsu | G06F 1/1624 248/461 |
| 8,780,544 B2 * | 7/2014 | Liang | G06F 1/1624 361/679.26 |
| 8,896,558 B2 * | 11/2014 | Lee | G06F 1/1637 248/371 |
| 8,902,585 B2 * | 12/2014 | Tseng | G06F 1/1607 361/679.09 |
| 8,908,364 B2 * | 12/2014 | Tseng | G06F 1/1616 248/921 |
| 8,917,500 B2 * | 12/2014 | Lee | G06F 1/1616 248/176.1 |
| 8,922,984 B2 * | 12/2014 | Chen | G06F 1/1679 211/181.1 |
| 2003/0103324 A1 | 6/2003 | Gallivan | |
| 2005/0139740 A1 | 6/2005 | Chen et al. | |
| 2006/0077622 A1 * | 4/2006 | Keely | G06F 1/1616 361/679.09 |
| 2007/0030634 A1 * | 2/2007 | Maskatia | G06F 1/1616 361/679.27 |
| 2008/0198542 A1 | 8/2008 | Kim | |
| 2009/0021898 A1 | 1/2009 | Konno et al. | |
| 2010/0309612 A1 | 12/2010 | Liang et al. | |
| 2011/0156559 A1 * | 6/2011 | Wu | H04M 1/0237 312/309 |
| 2012/0127641 A1 * | 5/2012 | Seo | H04M 1/0237 361/679.01 |
| 2012/0236476 A1 * | 9/2012 | Wu | G06F 1/1624 361/679.01 |
| 2013/0127730 A1 * | 5/2013 | Lee | G06F 1/1637 345/169 |
| 2013/0128440 A1 * | 5/2013 | Chen | G06F 1/1679 361/679.09 |
| 2013/0128441 A1 * | 5/2013 | Lee | G06F 1/1616 361/679.09 |
| 2013/0128442 A1 * | 5/2013 | Tseng | G06F 1/1616 361/679.09 |
| 2013/0128443 A1 * | 5/2013 | Tseng | G06F 1/1616 361/679.12 |
| 2013/0141855 A1 * | 6/2013 | Tseng | G06F 1/1607 361/679.09 |
| 2013/0329351 A1 * | 12/2013 | Lin | H05K 5/0239 361/679.27 |
| 2014/0029232 A1 * | 1/2014 | Sun | G06F 1/1681 361/809 |
| 2014/0043746 A1 * | 2/2014 | Lai | G06F 1/1624 361/679.17 |
| 2014/0043747 A1 * | 2/2014 | Lai | G06F 1/1616 361/679.26 |
| 2014/0043749 A1 * | 2/2014 | Lai | G06F 1/1681 361/679.27 |
| 2014/0049891 A1 * | 2/2014 | Lee | G06F 1/1637 361/679.15 |
| 2014/0092540 A1 * | 4/2014 | Hung | G06F 1/1601 361/679.05 |

FOREIGN PATENT DOCUMENTS

| | | |
|---|---|---|
| TW | 556583 U | 12/2003 |
| TW | 584227 U | 4/2004 |
| TW | M243748 U | 9/2004 |
| TW | CN1784133 A | 6/2006 |
| TW | 200707220 | 2/2007 |
| TW | M323952 U * | 12/2007 |
| TW | 200815963 A | 4/2008 |
| TW | 200827832 A | 7/2008 |
| TW | M367554 U * | 10/2009 |
| TW | M398651 U | 2/2011 |
| TW | 201128355 A | 8/2011 |

OTHER PUBLICATIONS

Taiwan Patent Office, Office Action of corresponding Taiwan Application No. 101111901 (including 8 pages English translation of marked portion of pp. 1-12 of Office Action), issued Sep. 3, 2014, 23 pages.

China Patent Office, Office Action of corresponding CN Application No. 201210130319.7 (including 4 pages English translation of Office Action), issued Apr. 3, 2015, 12 pages.

* cited by examiner

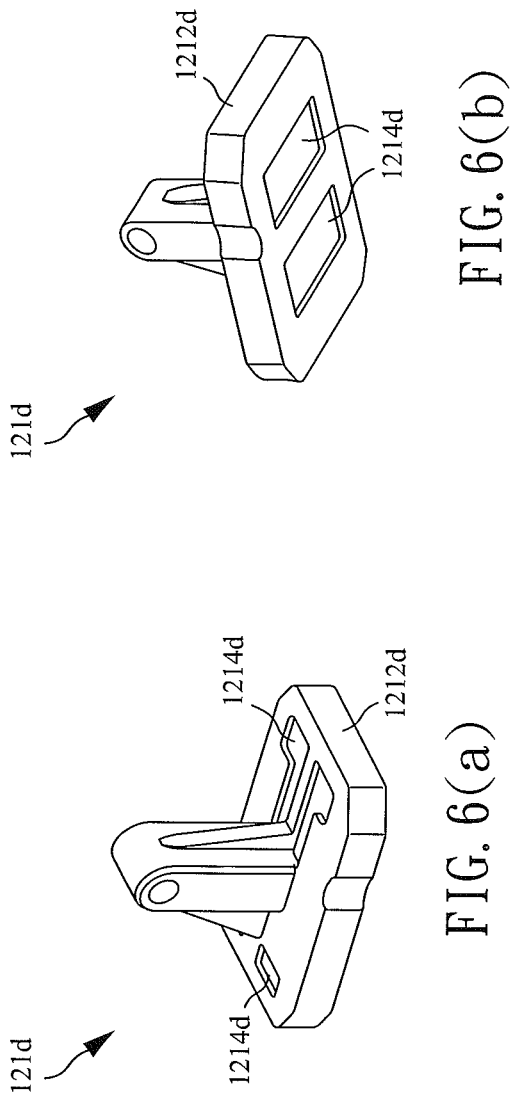

PORTABLE COMPUTER

CROSS-REFERENCE TO RELATED APPLICATIONS

This application is a divisional application of U.S. patent application Ser. No. 13/616,778 filed Sep. 14, 2012, now U.S. Pat. No. 9,218,022, which is hereby incorporated by reference.

BACKGROUND OF THE INVENTION

1. Field of the Invention

The present relates to a portable computer and, more particularly, to a portable computer which can move a display towards a user and keep the display at a tilted angle.

2. Description of the Related Art

Computing devices have become an indispensable part of our daily life. With the fast development of touch technologies, most hand-held devices or electronic devices such as a tablet PC, a smart phone, and a PDA now provide touch panels instead of a mouse or a keyboard as input devices, and these devices are equipped with operating system supporting touch functions to enable intuitive and convenient operations.

As notebook PCs are usually equipped with QWERTY keyboards and touch pads for input functions and as they also use an operating system which does not support touch functions or interfaces which recognize touch gestures, so few notebook PCs provide touch functions or designs in the past. However, as software vendors are rolling out new operating systems which can support touch functions and as people are becoming familiar with touch gestures required to operate tablet PCs or smart phones, it is now necessary for manufacturers to provide touch functions on notebook PCs or even transform their notebook PCs into tablet PCs. Due to a certain weight of the display, when a user opens the display to a suitable angle relative to the base for touch operations, the display is kept in a fixed position by a reactive torsion of a pivot bearing between the display and the base. However, when the user touches the display, a torque generated by the applied force and the distance between the point of applied force and the pivot bearing would cause the display to vibrate back and forth, making it inconvenient for the user to perform any touch function and hard to see the display clearly. Furthermore, when the user applies too much force on the display, the display could topple and fall backwards without proper support, and the display could be damaged to discourage the user to perform any touch function.

Therefore, a prior art technique discloses a support arm for supporting and pivotally connecting to the display.

In a prior art technique such as Taiwan Patent No. I316666 (U.S. Pat. No. 7,184,263B1), a portable computer uses a sheet-like support element to support a display and to let the display slide relative to the computer body via guide grooves on both sides of the keyboard to stand upright. However, this design can only apply for tablet PCs which have their displays faced upwards in a normal state and is not suitable for notebook PCs which usually have their displays faced down and towards a keyboard when not in use. Therefore, the prior art technique is designed specifically for tablet PCs having their display exposed outwardly and allows the user to slide the display to a tilted angle for operations. However, the display is not well protected, since it is exposed in many circumstances.

In another prior art technique such as Taiwan Patent No. 566583, a notebook PC has its display rotatably moved relative to a base via a plurality of connecting rods to change a viewing angle for the user. However, this prior art technique comprises a complicated design which involves the operations of pivoting, linking and sliding and various linkage elements to work. Therefore, it is disadvantageous to assemble and to operate the mechanism. Besides, with a complicated mechanism and exposed support and linkage mechanisms on both sides of the display, it is aesthetically unpleasant, and it is possible to hurt the user if the user's finger accidentally gets pinched between these mechanisms. Additionally, the prior art technique requires reserved spaces for disposing grooves and pivoting mechanisms on both sides of the base, and it also requires additional spaces for disposing supporting elements on both sides of the display case as well. Thus, the whole thing tends to be bulky and thick, and it could sacrifice the viewable area of the display.

Therefore, it is necessary to provide a structure which can stably support the display and slide the display to a suitable angle for the portable computer.

SUMMARY OF THE INVENTION

It is an object of the present invention to provide a portable computer which can move a display towards a user and keep the display at a tilted angle.

To achieve the above object, a portable computer of the present invention comprises a base, a display module, at least one supporting element, and at least one sliding assembly. The base, between a front end and a rear end, comprises a first area disposed at a front side of the base and a second area disposed at a rear side of the base. The display module comprises a connecting end, a display face, and a support plane opposite to the display face. Each supporting element comprises a first fixed end and a second fixed end. The first fixed end is pivotally connected to a portion of the display module other than the display face, so the display module can rotate relative to the supporting element. The second fixed end is pivotally connected to the rear side or a place adjacent to the rear end of the base, so the supporting element can rotate relative to the base. Each sliding assembly comprises a sliding block and a slide rail. The slide rail is disposed at least in the second area of the base. The sliding block is connected to the connecting end of the display module and can slide along the slide rail. The sliding block comprises at least one auxiliary sliding structure to reduce friction between the sliding block and the slide rail.

Therefore, when the display module is opened and rotated to a suitable angle relative to the base via the second fixed end of the at least one supporting element, the display module further rotates around the first fixed end with the first fixed end serving as a pivot point and simultaneously drives the connecting end to move from the second area towards the first area to a suitable position along with the sliding block. Then, the display module is supported by the at least one supporting element to keep a suitable tilted angle.

Through the design of the present invention, a user can turn the display module relative to the base to slide the connecting end of the display module towards the user to a suitable tilted angle via interactions between various pivoting elements and connecting rods. The display module is also supported by the at least one supporting element to provide a better viewing or operating effect for the user. The disposition of at least one auxiliary sliding structure can further reduce friction between the sliding block and the slide rail and can make the sliding operation smoother.

BRIEF DESCRIPTION OF THE DRAWINGS

In the drawings, similar reference numerals denote similar elements throughout the several views.

FIG. 3 (b) illustrates a schematic view of a second embodiment of a sliding block of the portable computer of the present invention.

FIG. 6 (a) illustrates a schematic view of a fifth embodiment of a sliding block of the portable computer of the present invention.

FIG. 6 (b) illustrates a schematic view of another angle of the fifth embodiment of a sliding block of the portable computer of the present invention.

FIG. 10 (b) illustrates a schematic view of the first embodiment of the portable computer of the present invention switched to an open state from the closed state.

DETAILED DESCRIPTION OF THE PREFERRED EMBODIMENTS

The advantages and innovative features of the invention will become more apparent from the following detailed description of the better embodiments when taken in conjunction with the accompanying drawings.

Figure 1:
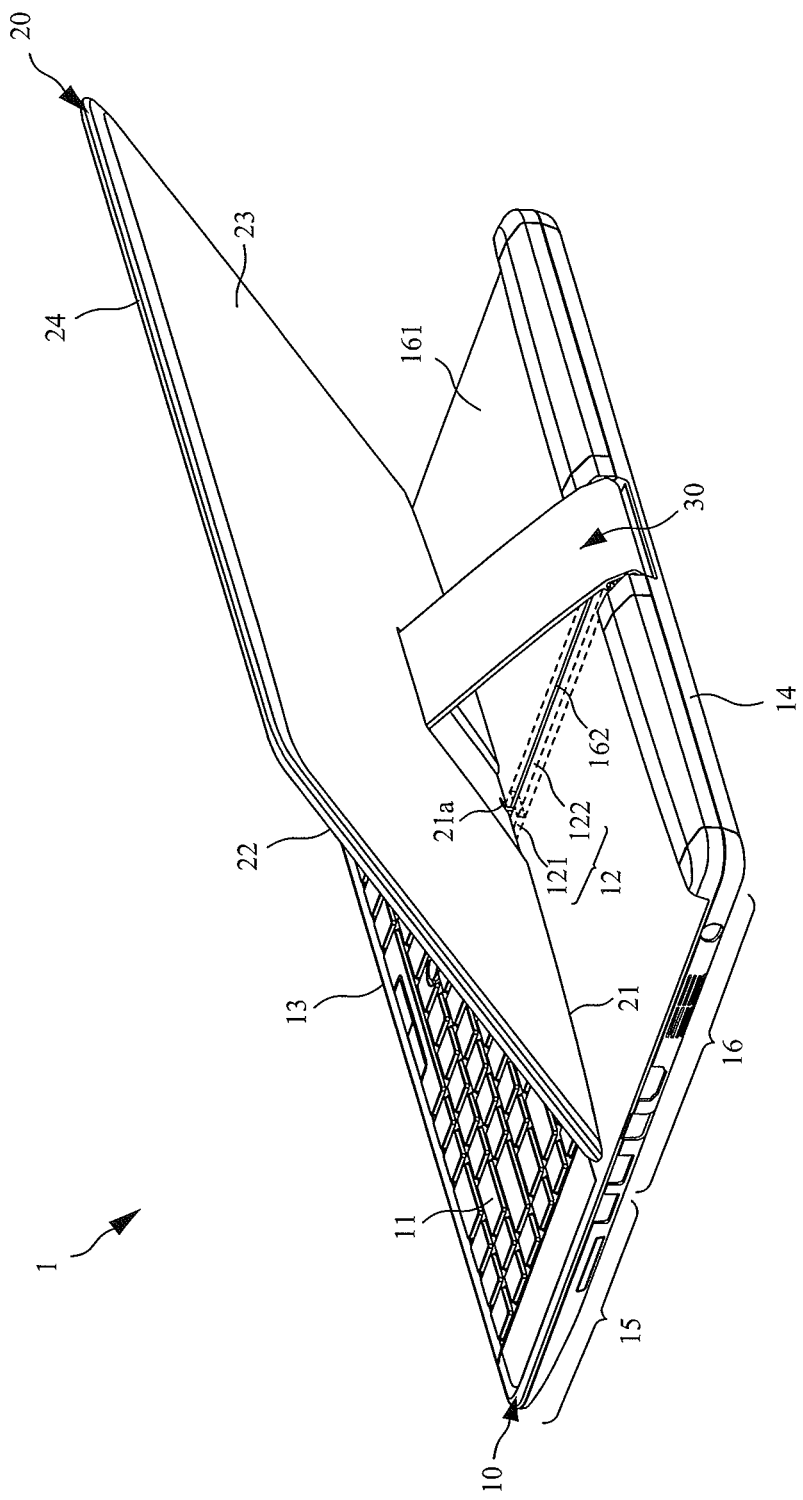
FIG. 1 illustrates a schematic view of a portable computer of the present invention.
Figure 2:
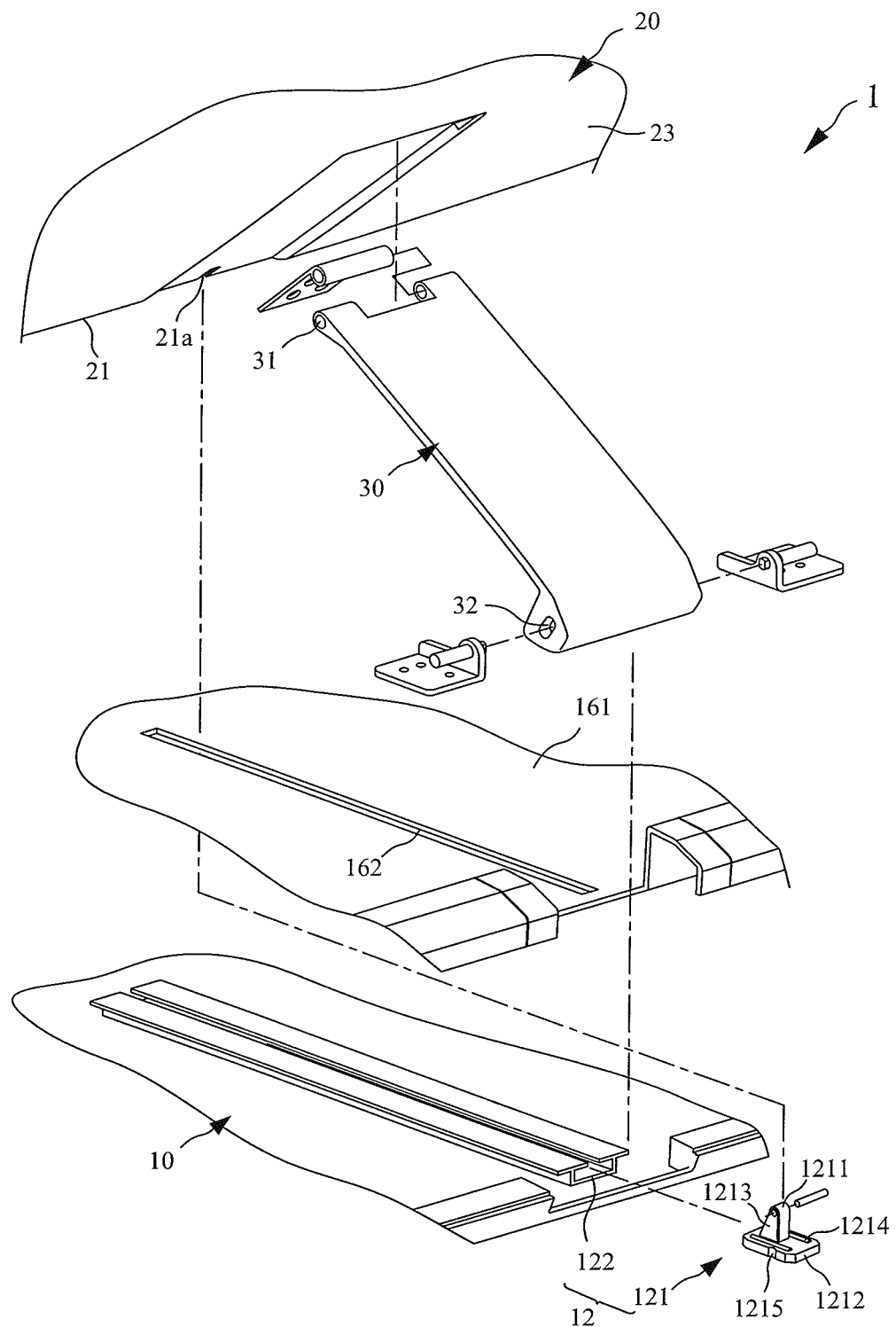
FIG. 2 illustrates a partial explosive view of a first embodiment of the portable computer of the present invention.

Please refer to both FIG. 1 and FIG. 2. FIG. 1 illustrates a schematic view of a portable computer 1 of the present invention; and FIG. 2 illustrates a partial explosive view of the first embodiment of the portable computer 1. In an embodiment of the present invention, the portable computer 1 is a notebook PC, but according to various types of applications, the portable computer 1 can be a tablet PC, a mini laptop, or other electronic devices comprising flip-top type display modules without limiting the scope of the present invention.

As shown in FIG. 1 and FIG. 2, the portable computer 1 of the present invention comprises a base 10, a display module 20, and a supporting element 30. Main computing components and related electronic components are disposed at the interior of the base 10. The top of the base 10 is segmented into a first area 15 and a second area 16 between a front end 13 and a rear end 14. The first area 15 is disposed near the front end 13, and the second area 16 is disposed near the rear end 14. The first area 15 is provided for disposing a keyboard 11 or/and other input devices, such as a touch pad or a track point, and the second area 16 comprises a sliding assembly 12. In other embodiments, the sliding assembly 12 can extend forward to a part or all of the first area 15. It is noted that the sliding assembly 12 can be disposed in a central portion of the second area 16 or a substantially central portion of the second area 16.

The sliding assembly 12 comprises a sliding block 121 and a slide rail 122. The sliding block 121 combines sliding and pivotally connecting functions. The sliding block 121 can move along the slide rail 122 to slide in the second area 16 between the rear end 14 of the base 10 and the keyboard 11 with respect to the base 10. A slit 162 is disposed in the center of the surface 161 of the second area 16, and the sliding assembly 12 is disposed at a position at the bottom of the second area 16 corresponding to the slit 162. In other embodiments, the sliding assembly 12 can also be extended from the second area 16 to the first area 15. Thus, the slit 162 is located on the surface of the second area 16 and a part or all of the first area 15, and the slide rail 122 can be correspondingly disposed below the surface of the second area 16 and the first area 15.

The display module 20 comprises a connecting end 21, a display face 22, a support plane 23, and a free end 24. The display face 22 is disposed opposite to the support plane 23. The connecting end 21 is opposite to the free end 24, and the display module 20 is pivotally connected to the sliding block 121 at the central portion 21a of the connecting end 21 via hinges or bearing elements to form a rotatable pivot point and to enable the display module 20 to rotate relative to the sliding block 121. The display module 20 can have a display screen disposed at the display face 22 and supporting touch functions for receiving touch inputs from the user.

The supporting element 30 comprises a first fixed end 31 and a second fixed end 32. The first fixed end 31 can be pivotally connected to the support plane 23 of the display module 20 via hinges to form a rotatable pivot point, so that the display module 20 is able to rotate relative to the supporting element 30. The second fixed end 32 can be pivotally connected to the rear end 14 of the base 10 via hinges to form another rotatable pivot point, so that the supporting element 30 is able to rotate relative to the base 10.

As shown in FIG. 2, in an embodiment of the present invention, the sliding block 121 of the sliding assembly 12 comprises a pivoting portion 1211, a sliding portion 1212, and a connecting portion 1213. The connecting end 21 of the display module 20 is rotatably pivoted to the sliding block 121 via the pivoting portion 1211. For instance, the pivoting portion 1211 can be a hinge element without torsion and can be rotated simply by a pin. Alternately, the pivoting portion 1211 can be a hinge element conventionally disposed between the display module and the base of a laptop and capable of generating torsion or suitable rotation friction. The sliding portion 1212 is connected to the pivoting portion 1211 via the connecting portion 1213, and the slide rail 122 of the sliding assembly 12 is provided for disposing the sliding portion 1212 of the sliding block 121. In this embodiment, the slide rail 122 is a groove-like structure, and the sliding portion 1212 is a block structure having its size fitted to the slide rail 122, so the sliding portion 1212 can slide within the slide rail 122. However, the present invention is not limited thereto. Additionally, according to different design requirements, the sliding portion 1212 further comprises at least one positioning portion 1215, such as a grooved point. The positioning element (not shown, such as a convex spot) disposed by way of the positioning portion 1215 together with the slide rail 122, provides a positioning effect when the sliding block 121 slides to a certain spot.

To comply with the consistency and the sense of design of the portable device 1, the slide rail 122 of the sliding assembly 12 is disposed below the surface 161 of the second area 16 of the base 10 and corresponds to the position of the slit 162 to be a hidden disposition. The structure of the sliding block 121 of the sliding assembly 12 corresponds to the slit 162 of the base surface 161 of the base 10, so that a width of the slit 162 is smaller than the sliding portion 1212 and not smaller than a thickness of the connecting portion 1213. However, the width of the slit 162 can be smaller than the thickness of the connecting portion 1213 if stretchable material, such as flannel, is used as the structure of the slit 162. Thereby, the connecting portion 1213 of the sliding block 121 can go through and move along the slit 162, and allows the pivoting portion 1211 to protrude out of the surface 161 of the base 10, so that the connecting end 21 of the display module 20 and the exposed pivoting portion 1211 can be pivotally connected to each other. With this design, apart from the exposed pivoting portion 1211 of the sliding block 121 and a part of the connecting portion 1213, the other portion of the sliding block 121 and the slide rail 122 can be hidden below the surface 161 of the base 10. The exposed pivoting portion 1211 and the surface 161 of the base 10 are kept apart for a certain distance with the exposed partial connecting portion 1213, so that the display module 20 pivotally connected to the pivoting portion 1211 can rotate smoothly without being interfered by the base 10. Therefore, the design of the present invention can provide an overall aesthetic appearance, and cannot affect the operations between the sliding block 121 and the display module 20.

Figure 3B:
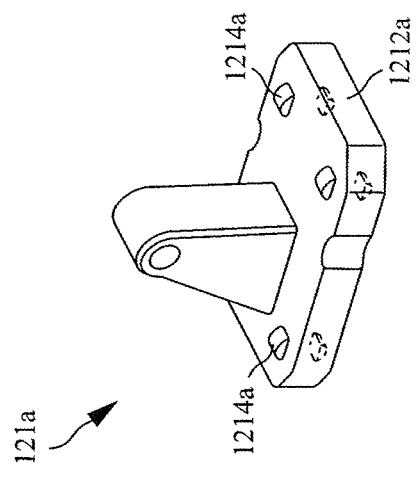
FIG. 3 (a) illustrates a schematic view of the first embodiment of a sliding block of the portable computer of the present invention.
Figure 3A:
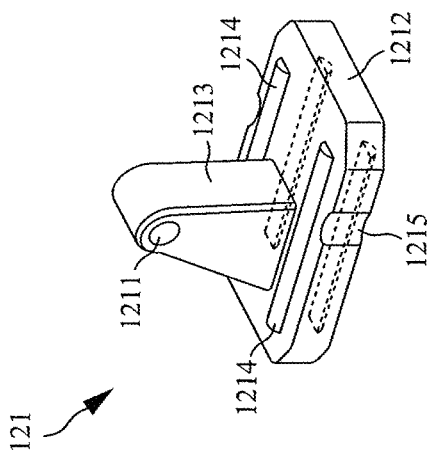

Please refer to both FIG. 3(a) and FIG. 3(b). FIG. 3(a) illustrates a schematic view of the first embodiment of a sliding block 121 of the portable computer in the present invention; and FIG. 3(b) illustrates a schematic view of the second embodiment of a sliding block 121a of the portable computer in the present invention. As shown in FIG. 2 and FIG. 3(a), to increase smoothness and stability of the operation of the sliding block 121 white moving along the slide rail 122, the sliding portion 1212 of the sliding block 121 comprises at least one auxiliary sliding structure 1214 to reduce the friction between the sliding portion 1212 and the inner wall of the slide rail 122 as it travels in the slide rail 122. Combining the above two embodiments, the auxiliary sliding structure 1214 of the sliding portion 1212 is at least one convex-like structure which is disposed at the outer surface of the sliding portion 1212 (the portion contacted with the inner wall of the slide rail 122, such as the top or bottom surface of the sliding portion 1212) for reducing the contact area between the sliding portion 1212 and the slide rail 122. With the first embodiment of FIG. 3(a), each auxiliary sliding structure 1214 uses a convex-like strip structure, so only plural line contacts can be formed between the sliding portion 1212 and the slide rail 122 to reduce significantly the contact area between the sliding portion 1212 and the slide rail 122. The second embodiment of FIG. 3(b) is a variation of the first embodiment mentioned previously. As shown in FIG. 3(b), each auxiliary sliding structure 1214a of the sliding portion 1212a is replaced with a convex spot structure, so only plural point contacts can be formed between the sliding portion 1212a of the sliding block 121a and the slide rail 122, to further reduce the contact area between the sliding portion 1212a and the slide rail 122. However, the type of the convex-like structure mentioned in the present invention is not limited to the embodiments previously mentioned.

Figure 4:
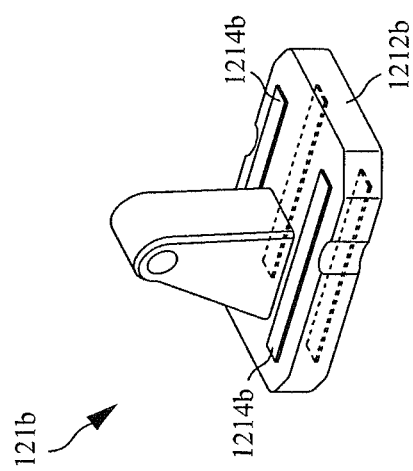
FIG. 4 illustrates a schematic view of a third embodiment of a sliding block of the portable computer of the present invention.

Please refer to FIG. 4 for a schematic view of the third embodiment of a sliding block 121b of the portable computer 1 of the present invention. This embodiment is a variation of the first embodiment previously mentioned. As shown in FIG. 4, in this embodiment, the at least one auxiliary sliding structure 1214b of the sliding portion 1212b is of at least one sheet-like structure with a smooth surface. Each auxiliary sliding structure 1214b is disposed at the outer surface of the sliding portion 1212b, to form a wear-resistant and smooth flat surface via the material characteristics of each sheet-like structure. For instance, after cutting a proper size of a thin sheet of Teflon and pasting it to the top and bottom surface of the sliding portion 1212b, only plural plane contacts with small areas can be formed between the sliding portion 1212b of the sliding block 121b and the slide rail 122. The at least one auxiliary sliding structure 1214b reduces the size of the original contact area between the sliding portion 1212d and the slide rail 122 and the friction between the sliding portion 1212b and the slide rail 122 as the sliding portion 1212b travels. The material of the sheet-like structure mentioned previously can be any material with the characteristics of smoothness and wear-resistance. It is not limited to the present embodiment.

Figure 5B:
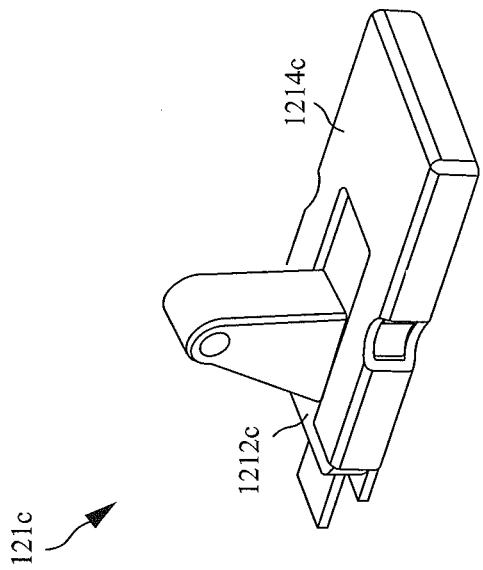
FIG. 5(a) illustrates a schematic view of a fourth embodiment of the portable computer of the present invention before combining the sliding portion to the auxiliary sliding structure.
FIG. 5 (b) illustrates a schematic view of the fourth embodiment of the portable computer of the present invention after combining the sliding portion to the auxiliary sliding structure.
Figure 5A:
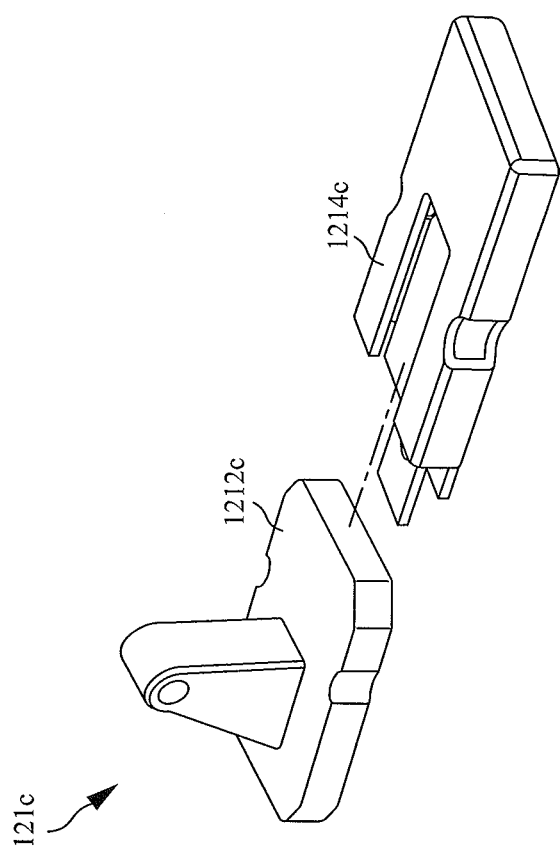

Please refer to FIG. 5(a) and FIG. 5(b). FIG. 5(a) illustrates a schematic view of the fourth embodiment of the portable computer in the present invention before combining a sliding portion 1212c to a auxiliary sliding structure 1214c; and FIG. 5(b) illustrates a schematic view of the fourth embodiment of the portable computer of the present invention after combining a sliding portion 1212c to a auxiliary sliding structure 1214c. As shown in FIG. 5(a) and FIG. 5(b), in the present embodiment, the at least one auxiliary sliding structure 1214c of the sliding portion 1212c is of a bush structure with a receiving space corresponding to the sliding portion 1212c. The bush structure is made of material of wear-resisting and friction-reducing characteristics. For example, POM or similar material is used to reduce the friction as the sliding portion 1212c travels while contacting the slide rail 122. Under the condition of applying the bush structure, the sliding block 121c itself can be made of a metal or other material that has high mechanical strength to increase the hardness of the structure. However, it is not limited to the present embodiment.

Please refer to FIG. 6(*a*) and FIG. 6(*b*). FIG. 6(*a*) illustrates a schematic view of the fifth embodiment of a sliding block 121d of the portable computer in the present invention; and FIG. 6(*b*) illustrates a schematic view of another angle of the fifth embodiment of a sliding block 121d of the portable computer in the present invention. As shown in FIG. 6(*a*) and FIG. 6(*b*), in the present embodiment, the at least one auxiliary sliding structure 1214d of the sliding portion 1212d is of a groove-like structure, and is disposed at the outer surface of the sliding portion 1212d (the portion that will contact with the inner wall of the slide rail, for example, the top and bottom surface of the sliding portion 1212d). Each groove-like structure can store lubricating material, such as a liquid or gel lubricant, to provide a lubricating effect of the sliding portion 1212d and to reduce the friction as the sliding portion 1212d travels on the slide rail. The type of the groove-like structure and the material with the characteristics of the lubricant is not limited to the present embodiment.

Figure 7A:
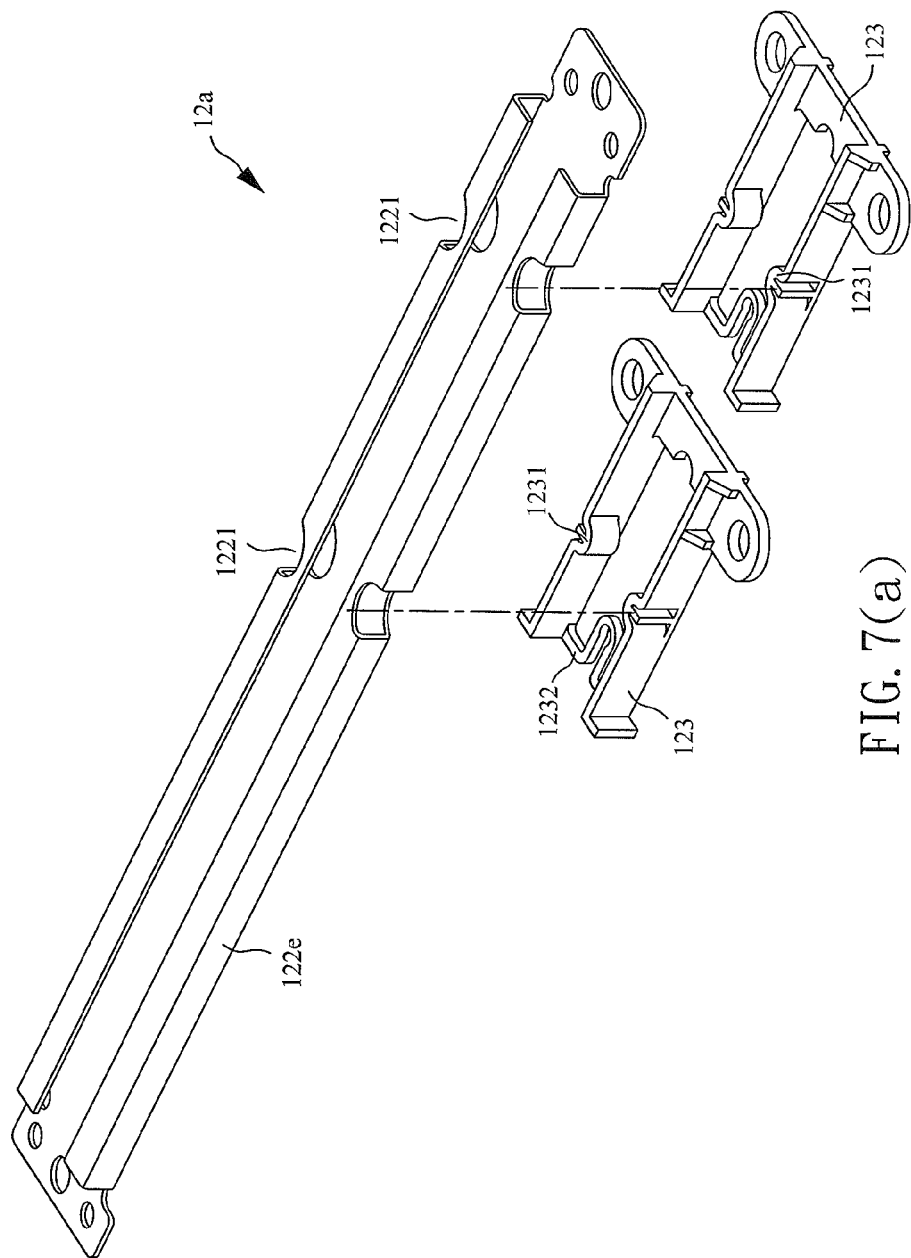
FIG. 7(a) illustrates a schematic view of another embodiment of a slide rail of the portable computer of the present invention.
Figure 7B:
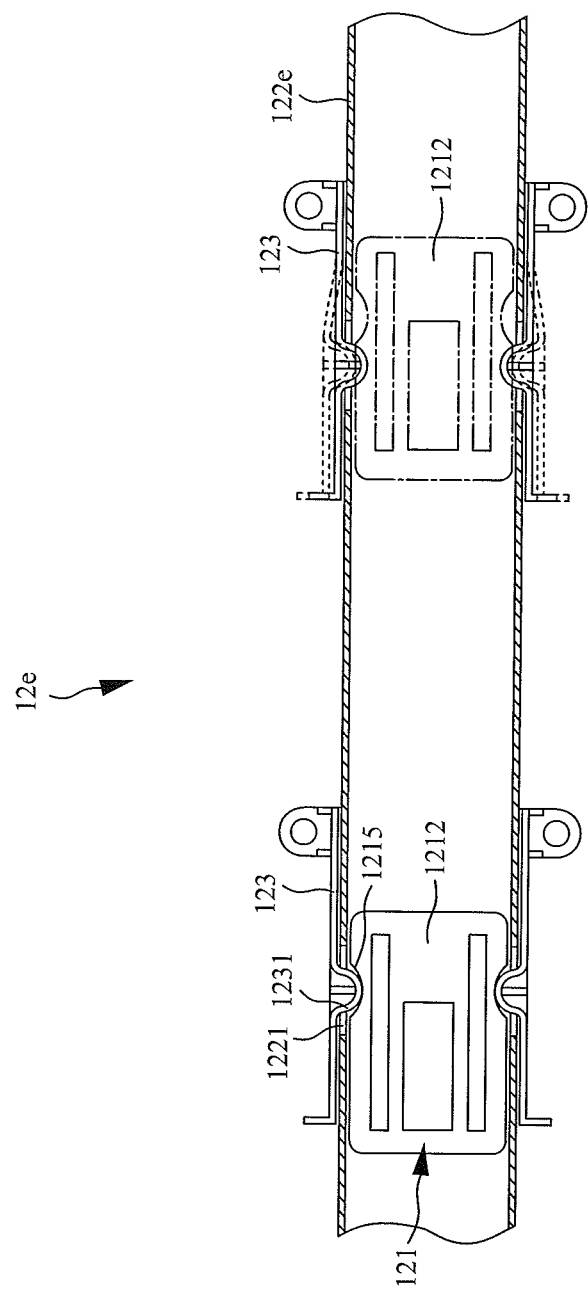
FIG. 7(b) illustrates an operating view of another embodiment of a sliding assembly of the portable computer of the present invention.

Please refer to FIG. 7(*a*) and FIG. 7(*b*). FIG. 7(*a*) illustrates a schematic view of another embodiment of a slide rail 122e of a sliding assembly 12a of the portable computer of the present invention; and FIG. 7(*b*) illustrates an operating view of another embodiment of a sliding assembly 12e of the portable computer of the present invention. This embodiment is a variation of the first embodiment previously mentioned, and the design of the slide rail 122e in this embodiment can be matched with the use of the sliding block in each embodiment mentioned previously, for example, the sliding block 121 of the first embodiment. It is noted that the slide rail 122e in FIG. 7(*a*) and FIG. 7(*b*) is disposed below the surface of the base (not shown), but the base and its surface are not illustrated in the figures for clearly showing the operation of the sliding assembly 12e.

As shown in FIG. 7(*a*), in this embodiment, the sliding assembly 12e further comprises at least one positioning element 123. Each positioning element 123 has at least one positioning structure 1231, such as a convex-like spot or interfering element, and each positioning element 123 provides the elastic positioning function by way of disposing the elastic structure 1232 or the elasticity of the positioning element 123. Each positioning element 123 is disposed at a corresponding fixed point on the slide rail 122e, and the position of the fixed point is based on the tilted angle of the display module as the display module slides with the sliding block. An opening 1221 can be disposed in the slide rail 122e corresponding to the corresponding fixed point. The positioning structures 1231 of the positioning element 123 can pass through the openings 1221 of the slide rail 122e and protrude into the slide rail 122e.

As shown in FIG. 7(*b*), the sliding portion 1212 of the sliding block 121 can slide within the slide rail 122e. When the sliding portion 1212 slides to any fixed point disposed with the positioning element 123, the sliding portion 1212 can achieve the positioning effect via the interactive interference of its own positioning portion 1215 and the positioning structure 1231 of the positioning element 123. With the disposition of the elasticity structure, each positioning element 123 can return to the original condition after the passing or departure of the sliding portion 1212. Accordingly, the positioning function can be provided by any fixed point at which the display module slides with the sliding block 121 on the slide rail 122e.

Figure 8:
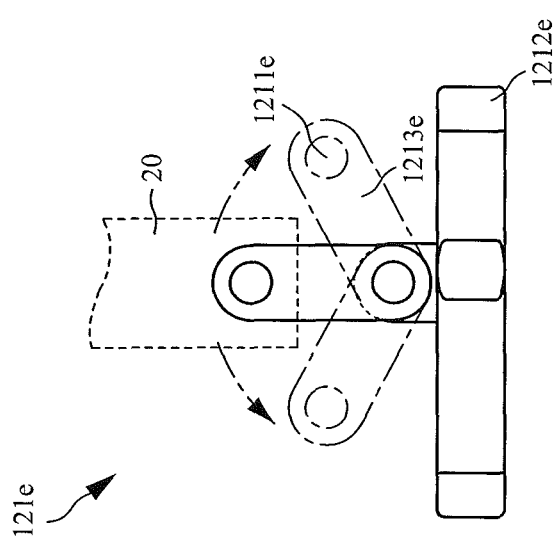
FIG. 8 illustrates a schematic view of a sixth embodiment of a sliding block of the portable computer of the present invention.

Please refer to FIG. 8, which is the illustration of a schematic view of the sixth embodiment of a sliding block 121e of the portable computer of the present invention. The present embodiment is a variation of the first embodiment mentioned previously. It is noted that the structures and the operations of the present embodiment can be applied to the sliding blocks in the other embodiments mentioned previously and are not limited to the present embodiment.

As shown in FIG. 8, in this embodiment, the connecting portion 1213e and the sliding portion 1212e of the sliding block 121e are pivotally connected to form a rotatable pivoted point, so that the connecting portion 1213e can rotate corresponding to the sliding portion 1212e. One end of the connecting portion 1213e is pivotally connected to the display module 20 by the pivoting portion 1211e, and another end of the connecting portion 1213e is pivotally connected to the sliding portion 1212e. When the display module 20 is forced to rotate, by the design of the double pivots of combining the connecting portion 1213e and the pivoting portion 1211e, the moment arm of the dragged sliding portion 1212e can be reduced, and the sliding smoothness and the stability of the sliding block 121e can be increased.

Figure 9:
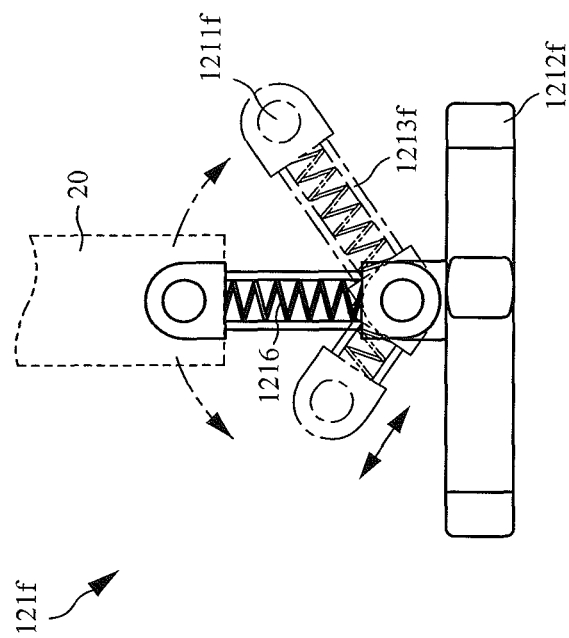
FIG. 9 illustrates a schematic view of a seventh embodiment of a sliding block of the portable computer of the present invention.

Please refer to FIG. 9, which illustrates a schematic view of the seventh embodiment of the sliding block 121f of the portable computer of the present invention. The embodiment is a variation of the sixth embodiment mentioned previously. Please note that the structures and the operations of the embodiment can be applied to the sliding blocks in the other embodiments mentioned previously and are not limited to the present embodiment.

As shown in FIG. 9, in this embodiment, one end of the connecting portion 1213f is pivotally connected to the display module by the pivoting portion 1211f. The connecting portion 1213f of the sliding block 121f is not only pivotally connected to the sliding portion 1212f, but the connecting portion 1213f further comprises an extendable structure 1216. With the disposition of the extendable structure 1216, the length of the connecting portion 1213f can be adjusted. In addition to reducing the moment arm of the sliding portion 1212f as it is dragged, the distance between the display module 20 and the surface of the base can be increased after extending the length of the connecting portion 1213f by the extendable structure 1216. It can also avoid the interference generated between the display module 20 and the base. Furthermore, the extendable structure 1216 can also comprise an elastic member, such as a spring, to provide the extendable structure 1216 with the elastic buffer function, which further enhances the sliding smoothness and stability of the sliding block 121f.

Figure 10A:
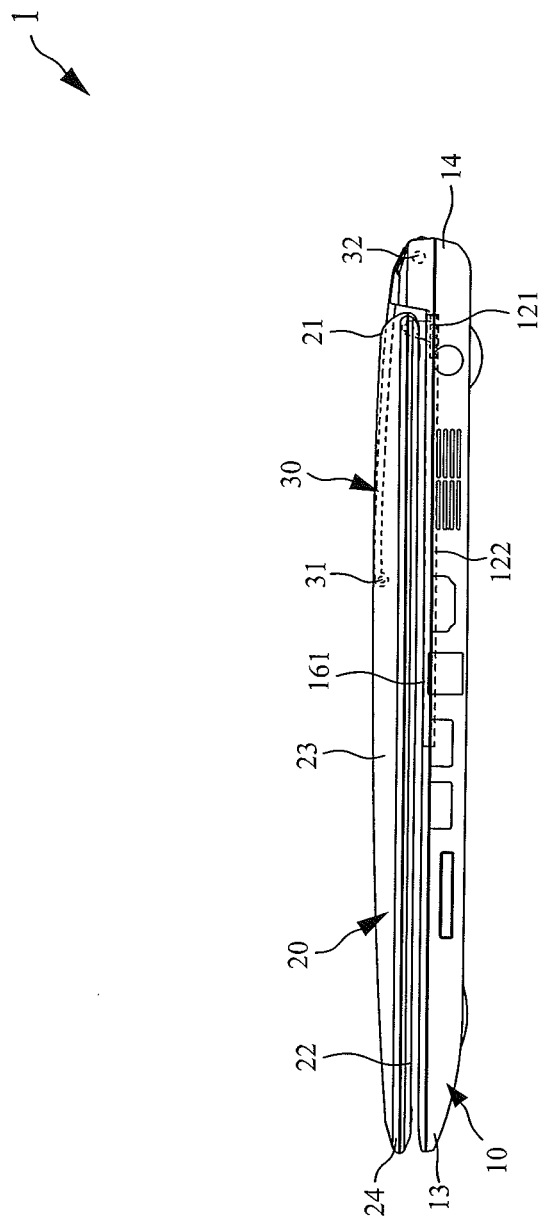
FIG. 10 (a) illustrates a schematic view of a first embodiment of the portable computer of the present invention in a closed state.
FIG. 10(c) illustrates a schematic view of the first embodiment of the portable computer of the present invention in the open state.
Figure 10B:
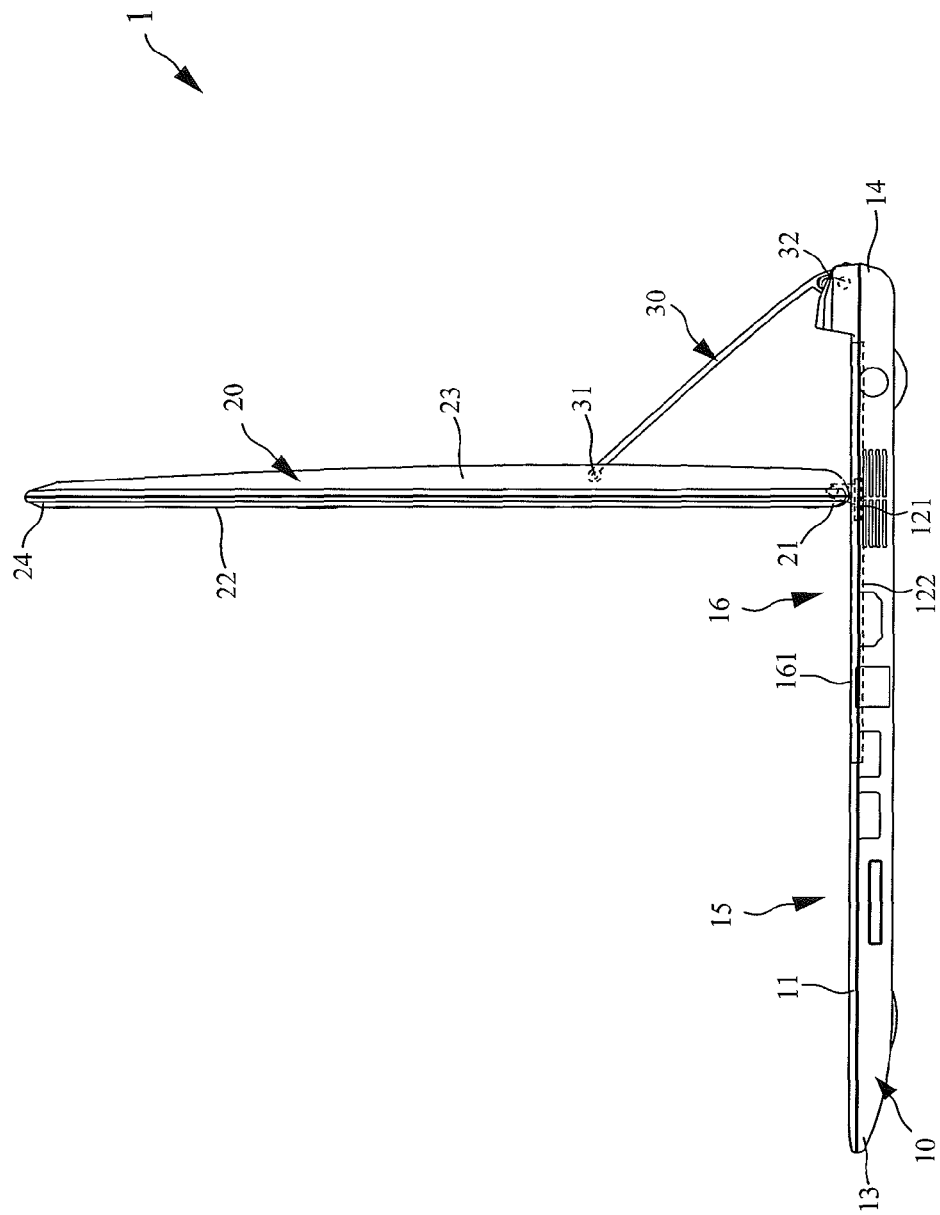
Figure 10C:
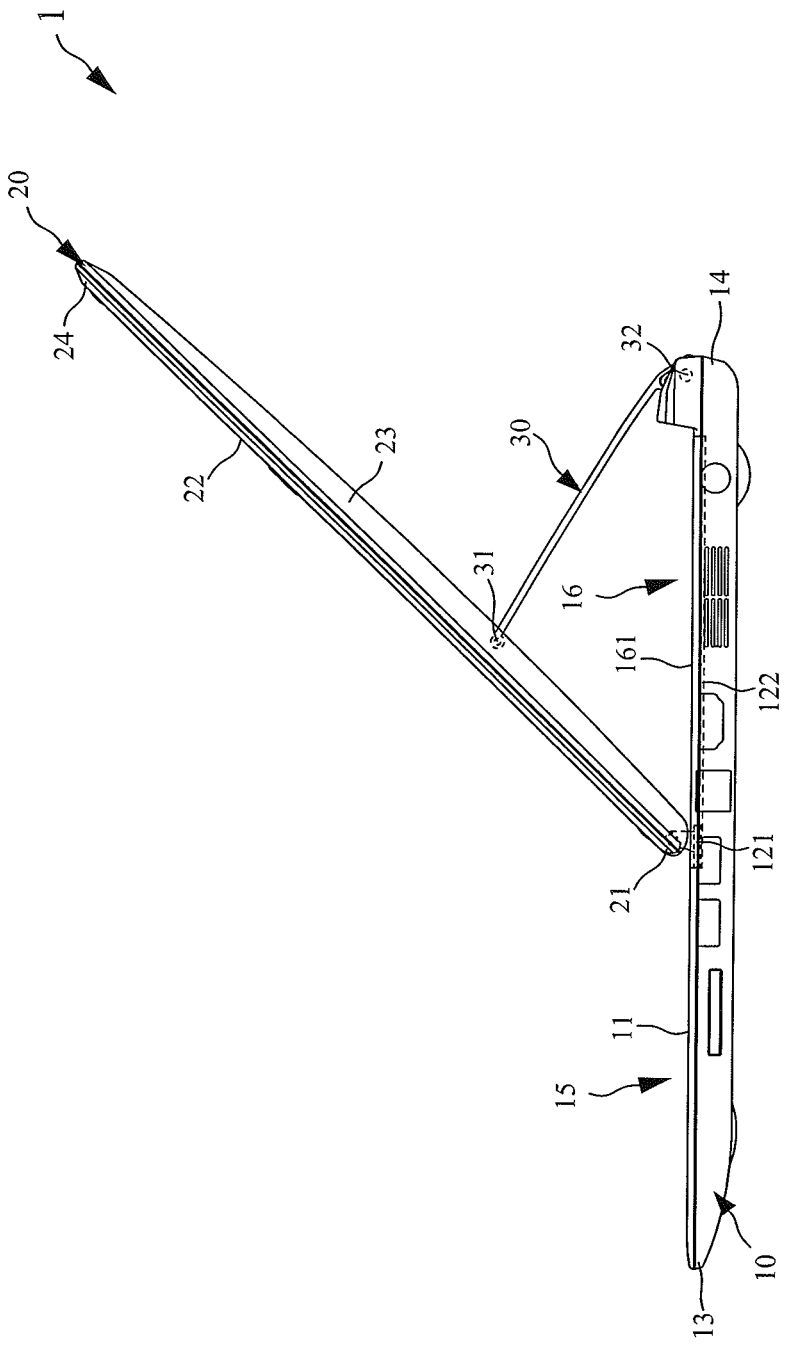

Please refer to FIG. 10(*a*), FIG. 10(*b*), and FIG. 10(*c*). FIG. 10(*a*) illustrates a schematic view of the first embodiment of the portable computer 1 in a closed state; FIG. 10(*b*) illustrates a schematic view of the first embodiment of the portable computer 1 switched from the closed state to an open state; and FIG. 10(*c*) illustrates a view of the first embodiment of the portable computer in the open state. Please note that the structures and the operations of the portable computer 1 of the present invention are illustrated by the first embodiment of the present invention, but other embodiments of the present invention can be applied to execute the same operations. It is not limited to the present embodiment.

As shown in FIG. 10(*a*), when the portable computer 1 is in a closed state, the display module 20 overlaps with the base 10 and is pivotally connected to the sliding block 121 via the connecting end 21, and at this time, the display face 22 of the display module 20 is facing the base 10. The supporting element 30 also overlaps with the display module 20 and is pivotally connected to the rear end 14 of the base 10 and the display module 20 via the first fixed end 31 and the second fixed end 32 respectively. In this embodiment, when the portable computer 1 is in the closed state, the connecting end 21 of the display module 20 and the second fixed end 32 of the supporting element 30 are on different axes substantially parallel with each other, and the length of the supporting element 30 is longer than the distance between the connecting end 21 of the display module 20 and the first fixed end 31 of the supporting element 30. However, based on different design requirements, the portable computer 1, while in the closed state, can have the connecting end 21 of the display module 20 and the second fixed end 32 of the supporting element 30 on the same axis to let the supporting element 30 have a same length as the distance between the connecting end 21 of the display module 20 and the first fixed end 31 of the supporting element 30.

As shown in FIG. 10(*b*), when the user exerts a force on the free end 24 opposite to the connecting end 21 of the display module 20 to try to open the display module 20, at first, the display module 20 rotates along with the supporting element 30 relative to the base 10 with the second fixed end 32 serving as a pivot point. After the display module 20 rotates to a certain angle, and since the supporting element 30 has its length not smaller than the distance between the connecting end 21 of the display module 20 and the first fixed end 31 of the supporting element 30, the display module 20 can rotate relative to the supporting element 30 with the first fixed end 31 of the supporting element 30 serving as the pivot point. Meanwhile, the display module 20 can rotate relative to the sliding block 121 with the connecting end 21 serving as the pivot point, and the sliding block 121 will drive the connecting end 21 of the display module 20 to slide from the second area 16 towards the first area 15.

As shown in FIG. 10(*c*), when the display module 20 continues to rotate with the first fixed end 31 of the supporting element 30 serving as the pivot point, and when the sliding block 121 drives the connecting end 21 of the display module 20 to slide towards the first area 15 to a suitable position (such as the end of the slide rail 122), then, the portable computer 1 is in an open state. At this time, the display module 20 has rotated to a suitable angle relative to the base 10, with the display place 22 of the display module 20 facing the user. The display module 20 is supported by the supporting element 30 to form a tilted angle relative to the base 10.

On the other hand, when the user tries to close the portable computer 1, the user can pull the free end 24 of the display module 20, so that the display module 20 is able to rotate around the first fixed end 31 of the supporting element 30 with the first fixed end 31 serving as the pivot point. The connecting end 21 will be driven by the sliding block 121 to slide towards the rear end 14 of the base 10 until it slides to the other end of the slide rail 122, and at this time, the display module 20 rotates around the second fixed end 32 of the supporting element 30 to return to the closed state.

Therefore, the portable computer 1 only needs to use the sliding assembly 12 disposed at the central position to complete opening/closing functions for the display module without using any complicated linkage elements or structures, thereby reducing the number of required elements and further shrinking the size of the portable computer 1.

Besides, the sliding assembly 12 is hidden below the slit 162 of the second area 16 to let the display module 20 stay close to the surface 161 of the second area 16, so the portable computer 1 looks integrated and consistent and eliminates the possibility of hurting the user's finger during opening/closing operations.

Specifically, in the embodiments, the sliding assembly 12 is disposed in the central position of the portable computer 1 and does not take up spaces on both sides of the base 10 and the display module 20. With this design, the user can use only one hand to hold the middle of the free end 24 of the display module 20, which corresponds to the position of the sliding assembly 12, to flip or slide the display module 20 smoothly. During this process, the display module 20 can maintain a stable sliding movement to facilitate operations. Furthermore, the user can initiate the opening process by flipping the display module 20 to let the display module 20 slide to a fixed position automatically, and the display module 20 is supported by the supporting element 30 to keep stable without shaking when the user performs touch operations on the display module 20.

In the previous embodiments, each portable computer 1 comprises a single supporting element 30 disposed at a central position relative to a sliding assembly 12 to achieve the object of the present invention. However, the present invention can have other implementations depending on different user requirements, effects, and mechanism designs. Thus, the number of the elements, the placement of the elements, variations of the size, etc. should be viewed as included in the scope of the present invention. Please note that the sliding block structures used in each of below embodiments of the portable computer are illustrated by the sliding block 121 of the sliding assembly 12 of the first embodiment of the present invention, but the sliding block 121 can be any other sliding block 121*a*, 121*b*, 121*c*, 121*d*, 121*e*, 121*f* or similar structures. It is not limited to the present embodiment.

Figure 11A:
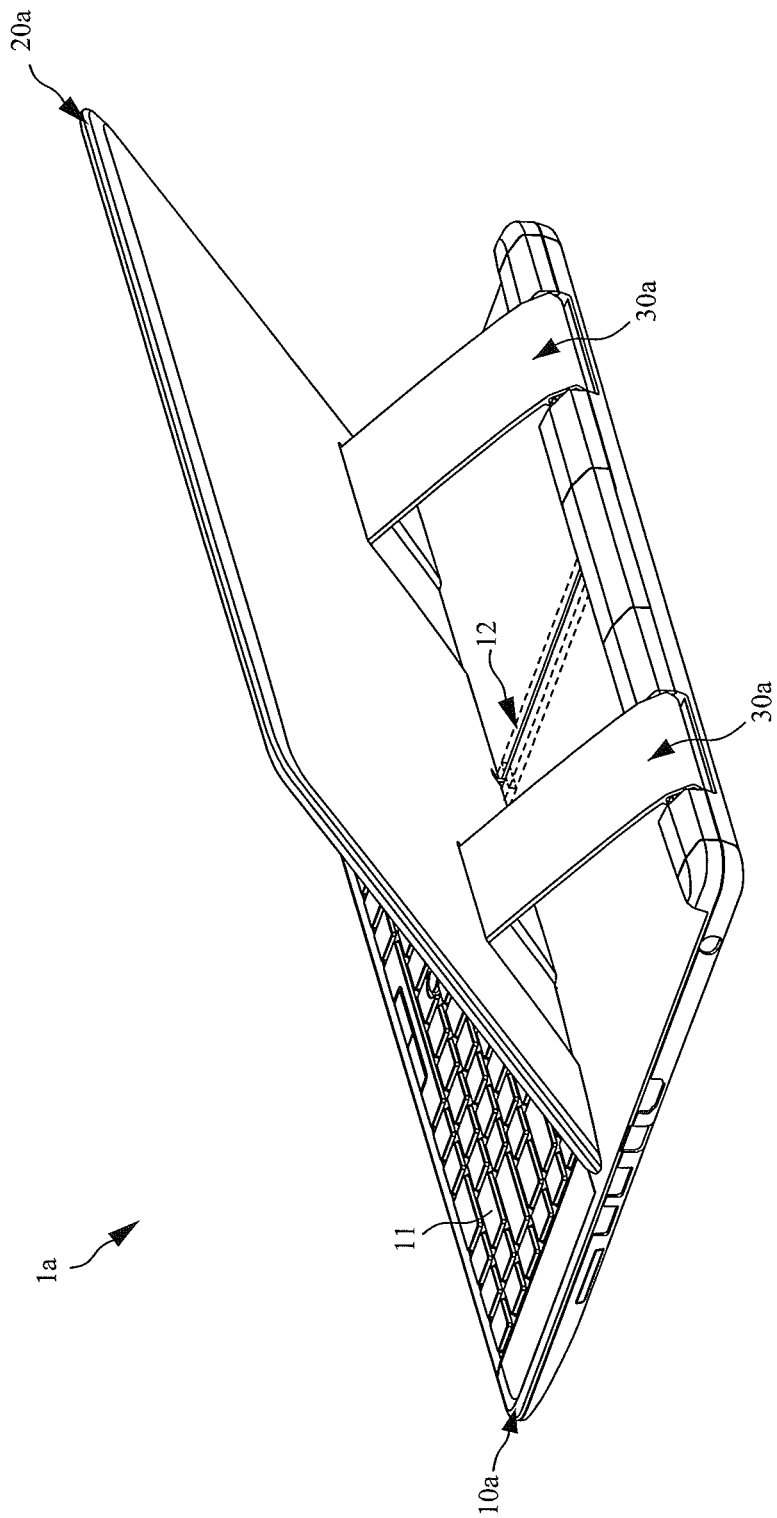
FIG. 11(a) illustrates a schematic view of a second embodiment of the portable computer of the present invention.
Figure 11B:
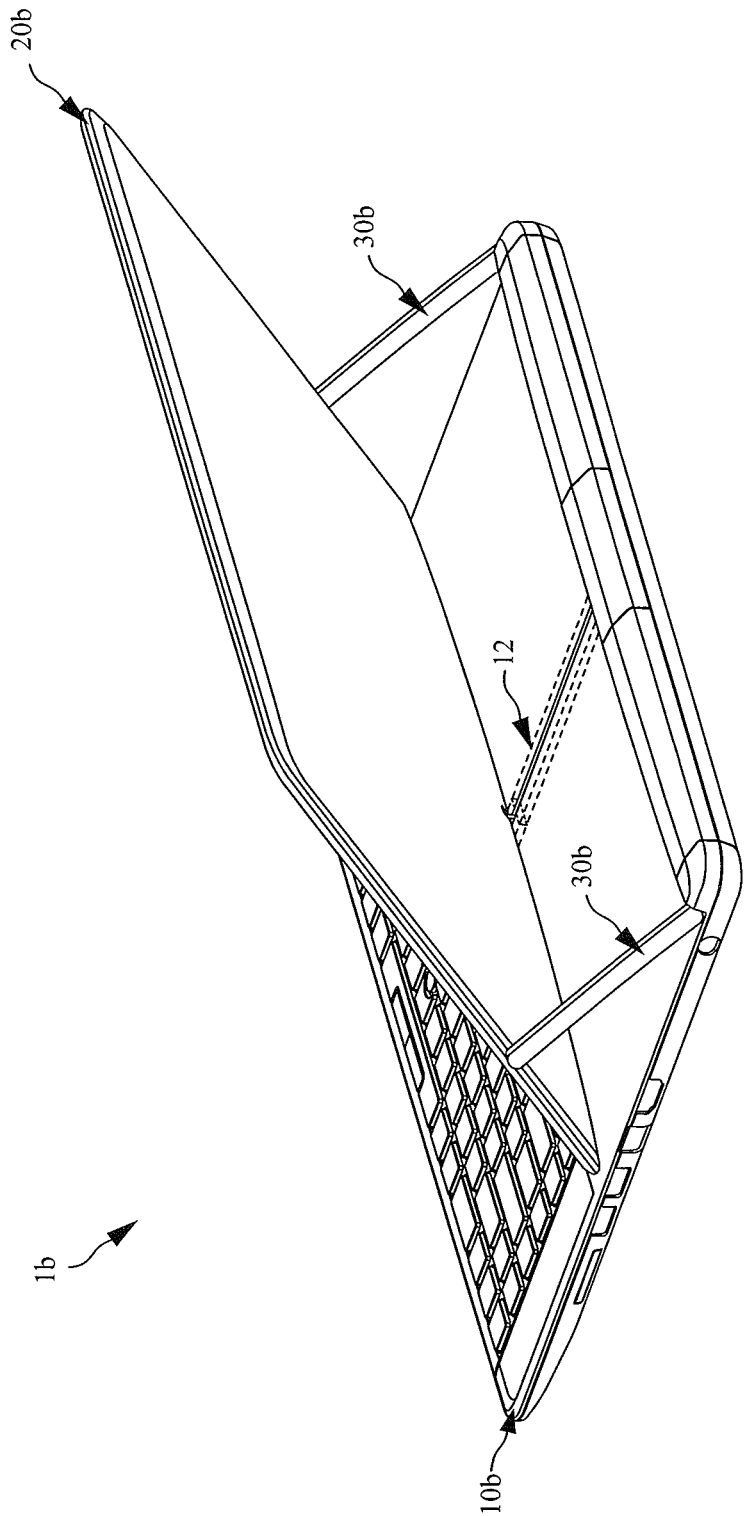
FIG. 11(b) illustrates a schematic view of a third embodiment of the portable computer of the present invention.

For example, please refer to both FIG. 11(*a*) and FIG. 11(*b*). FIG. 11(*a*) illustrates a schematic view of a second embodiment of the portable computer 1*a* of the present invention; and FIG. 11(*b*) illustrates a schematic view of a third embodiment of the portable computer 1*b* of the present invention. Alternatively, the portable computer can use more than one supporting element to support and stabilize the display module, and the supporting elements can be disposed at various positions. As shown in FIG. 11(*a*), in this embodiment, the portable computer 1*a* comprises a base 10*a* and two supporting elements 30*a* arranged in parallel and disposed at two sides of the central sliding assembly 12*a* respectively to form a symmetrical structure. Each supporting element 30*a* has its one end pivotally connected to a plane of the display module 20*a* other than the display face, and the other end pivotally connected to the rear end of the base. By adding additional supporting elements (point of support), the present invention can stably support the display module 20*a* in a sliding movement when it is opening or closing.

Also as shown in FIG. 11(*b*), this embodiment is a variation of the previous embodiment. The portable computer 1*b* comprises a base 10*b* and two supporting elements 30*b* disposed at two opposite sides near the rear end, and the supporting elements 30*b* are formed in a long stick-like shape and implemented as connecting rods for reducing the installation space and simplifying the assembling work, thereby enhancing the operations of the display module 20*b*.

However, in other embodiments, the present invention can have various implementations for a plurality of supporting elements.

Figure 12:
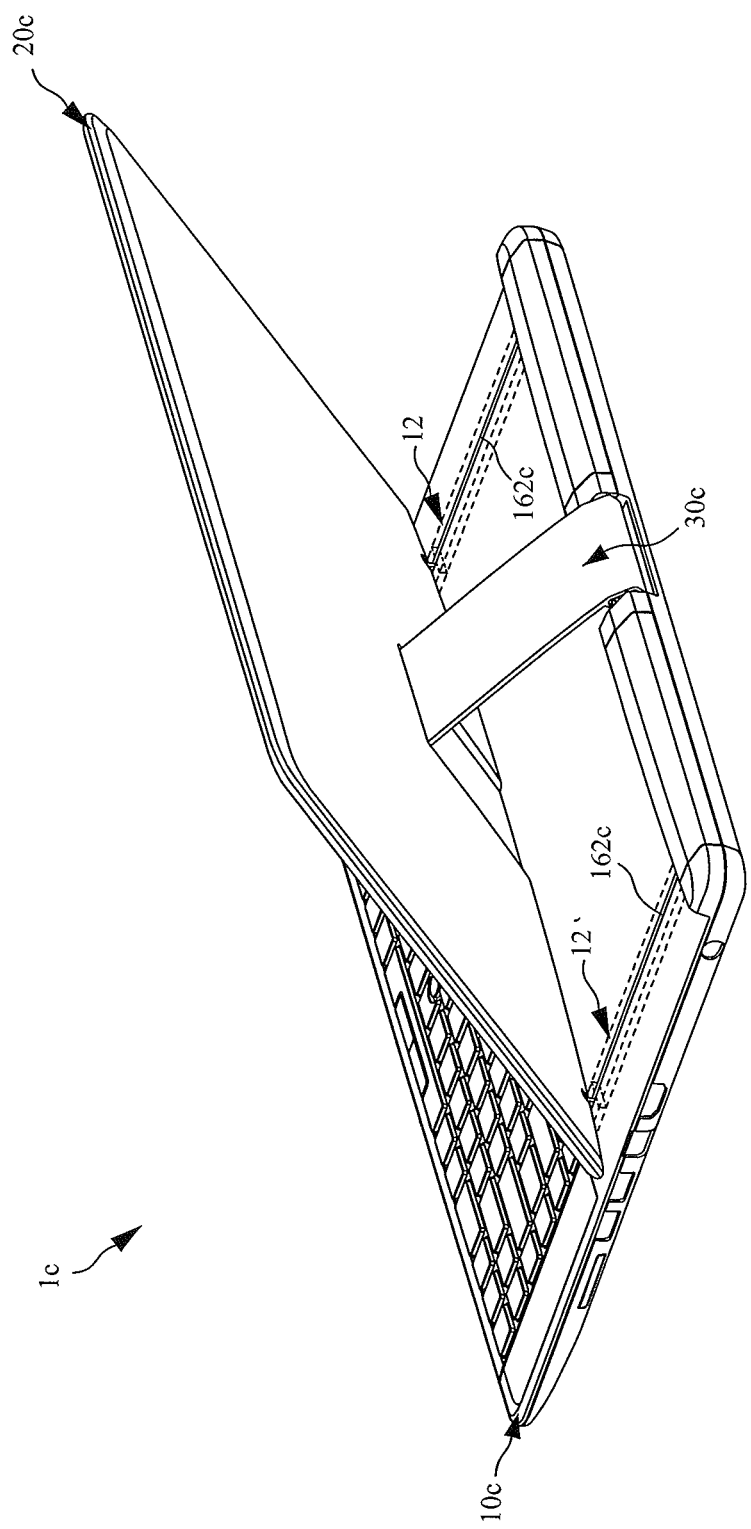
FIG. 12 illustrates a schematic view of a fourth embodiment of the portable computer of the present invention.

Please refer to FIG. 12 for a schematic view of a fourth embodiment of the portable computer $1c$ of the present invention. Alternatively, in addition to different implementation for the supporting element, the present invention can also adjust the position of the sliding assembly and the number and positions of the slits in the surface of the base to provide various functions. As shown in FIG. 12, in this embodiment, the portable computer $1c$ comprises a base $10c$ and two sliding assemblies 12 disposed at two sides of a single supporting element $30c$ respectively, and two slits $162c$ disposed at the base $10e$ to correspond to the two sliding assemblies 12. The two sliding assemblies 12 and the two slits $162c$ form a parallel symmetric structure. Therefore, when the display module $20c$ is opening or closing, the two sliding assemblies 12 can help to stabilize the sliding movement of the display module $20c$.

Those who skilled in the art can easily know that the three embodiments shown in FIG. 11(a) to FIG. 12 can be further combined to form a portable computer which comprises two supporting elements and two sliding assemblies. Therefore, it will not be described in detail.

Figure 13:
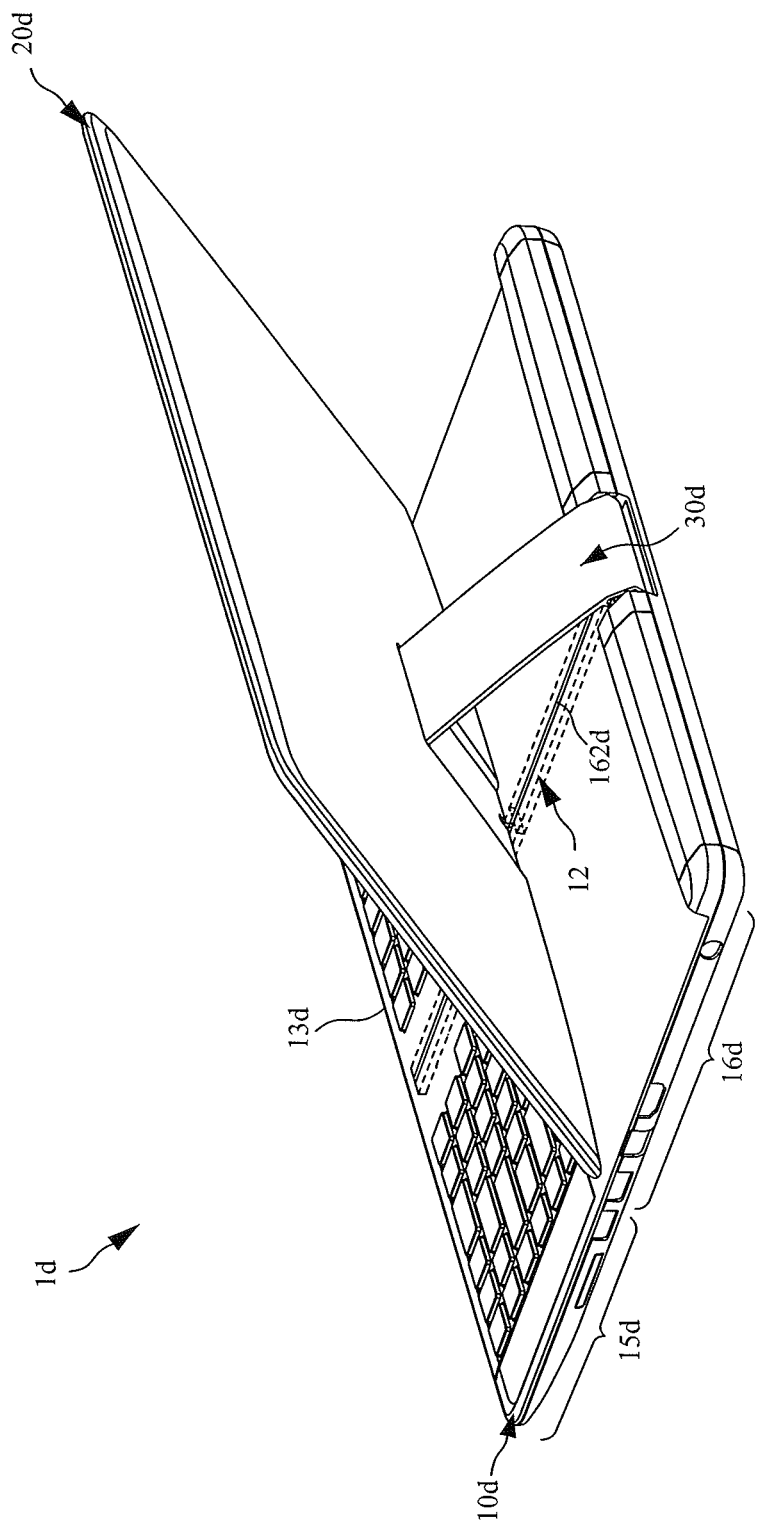
FIG. 13 illustrates a schematic view of a fifth embodiment of the portable computer of the present invention.

Please refer to FIG. 13 for a schematic view of a fifth embodiment of the portable computer $1d$ including the supporting element $30d$ of the present invention. The moving distance of the sliding assembly and the length of the corresponding slit can be adjusted according to various design needs. As shown in FIG. 13, in this embodiment, the sliding assembly 12 of the portable computer $1d$ and a corresponding slit $162d$ extend from a second area $16d$ of a base $10d$ to a first area $15d$ of the base $10d$ for extending a sliding distance of a display module $20d$ and increasing a range of the tilted angle of the display module $20d$. Even more, the display module $20d$ could lie flat on the base $10d$ to enhance versatility and capability of the portable computer $1d$. Based on applications and user requirements, the sliding assembly 12 and the corresponding slit $162d$ can choose to extend to a part or all (that is, approaching the position of a front end $13d$) of the first area $15d$, and the extended slit can have any characteristics shown in FIG. 11(a) to FIG. 12 or their combination.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A portable computer comprising:
a base comprising, between a front end and a rear end, a base surface including a first area disposed at a front side of the base and a second area disposed at a rear side of the base, wherein the base surface has a slit;
a display module comprising a connecting end, a display face, and a support plane opposite to the display face;
at least one supporting element, with each supporting element comprising a first fixed end and a second fixed end, with the first fixed end pivotally connected to a portion of the display module other than the display face, with the display module rotatable relative to the at least one supporting element; with the second fixed end pivotally connected to the rear end of the base or a proximity of the rear end of the base with the at least one supporting element rotatable relative to the base; and
at least one sliding assembly, with each sliding assembly comprising a sliding block and a slide rail, with the slide rail disposed below the base surface and at least in the second area of the base, with the slide rail including upper and lower surfaces parallel to and spaced from the base surface, with the upper surface intermediate the base surface and the lower surface, with the upper surface divided into first and second portions on opposite sides of the slit; with the sliding block connected with the connecting end of the display module and sliding along the slide rail, wherein the sliding block comprises a sliding portion and at least one auxiliary sliding structure, wherein the sliding portion is disposed within the slide rail and includes an outer surface abutting with the upper and lower surfaces of the slide rail, wherein the at least one auxiliary sliding structure is at least a sheet-like structure with a flat surface disposed at the outer surface and abutting at least one of the upper and lower surfaces of the slide rail to reduce friction between the sliding block and the slide rail;
wherein when the display module is opened and rotated to an angle relative to the base via the second fixed end of the at least one supporting element, the display module further rotates around the first fixed end with the first fixed end serving as a pivot point and simultaneously drives the connecting end to move from the second area towards the first area to a suitable position along with the sliding block; and then the display module is supported by the at least one supporting element to keep a suitable tilted angle.

2. The portable computer as claimed in claim 1, wherein the first area is disposed with a keyboard.

3. The portable computer as claimed in claim 1, wherein the at least one supporting element has a length not smaller than a distance between the connecting end of the display module and the first fixed end of the at least one supporting element.

4. The portable computer as claimed in claim 1, wherein the sliding block further comprises a pivoting portion and a connecting portion, wherein the sliding portion is connected to the pivoting portion via the connecting portion, and wherein the connecting end of the display module is pivotally connected to the sliding block via the pivoting portion.

5. The portable computer as claimed in claim 4, wherein the connecting portion of the sliding block goes through the slit with the pivoting portion and a portion of the connecting portion protruding out of the base surface; and wherein the slit has a width smaller than that of the sliding portion.

6. The portable computer as claimed in claim 5, wherein the pivoting portion and the base surface are spaced apart by a spacing.

7. The portable computer as claimed in claim 5, wherein the base surface having the slit corresponds to the second area; and wherein the slide rail is disposed correspondingly below the base surface of the second area corresponding to the slit.

8. The portable computer as claimed in claim 4, wherein the sliding assembly further comprises at least one positioning element, wherein each positioning element is disposed at a fixed point in the slide rail, and wherein the sliding portion further comprises a positioning portion, with a positioning effect provided via the interference of each positioning element and the positioning portion as the sliding block slides to the fixed point.

9. The portable computer as claimed in claim 8, wherein the at least one positioning element comprises at least one positioning structure, wherein the slide rail comprises at least one hole disposed corresponding to the position of the fixed point; wherein the at least one positioning structure of the at least one positioning element passes through the at least one hole and be protruded in the slide rail, with the sliding portion positioned by the interference of the positioning portion of the sliding portion and the at least one positioning structure.

10. The portable computer as claimed in claim 1, wherein with the display module overlapping with the base in a closed state, the connecting end of the display module and the second fixed end of the at least one supporting element are respectively on different axes substantially parallel with each other.

11. The portable computer as claimed in claim 1, wherein the at least one supporting element comprises two support elements arranged in parallel.

12. The portable computer as claimed in claim 1, wherein the at least one sliding assembly comprises a single sliding assembly disposed at a central position of at least the second area of the base; wherein the slide rail is disposed at the central position of at least the second area of the base, and wherein the sliding block is correspondingly disposed at a central position of the connecting end of the display module.

13. The portable computer as claimed in claim 1, wherein the sliding block is rotatably and pivotally connected with the connecting end of the display module.

* * * * *